(12) United States Patent
Trachtenberg et al.

(10) Patent No.: US 10,440,134 B1
(45) Date of Patent: Oct. 8, 2019

(54) SYSTEMS AND METHODS FOR COMPLIANCE ENFORCEMENT IN INTERNET-BASED SOCIAL NETWORKS

(71) Applicant: Microsoft Technology Licensing, LLC, Redmond, WA (US)

(72) Inventors: Adam Trachtenberg, Mountain View, CA (US); Carleton Miyamoto, Mountain View, CA (US); Vyacheslav Dubodelov, Redwood City, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 147 days.

(21) Appl. No.: 15/371,421

(22) Filed: Dec. 7, 2016

(51) Int. Cl.
*H04L 29/08* (2006.01)
*H04L 12/58* (2006.01)
*G06Q 50/00* (2012.01)

(52) U.S. Cl.
CPC .......... *H04L 67/22* (2013.01); *G06Q 50/01* (2013.01); *H04L 51/12* (2013.01); *H04L 51/32* (2013.01)

(58) Field of Classification Search
CPC ......... H04L 67/22; H04L 51/32; H04L 51/12; G06Q 50/01
See application file for complete search history.

(56) References Cited

U.S. PATENT DOCUMENTS

| | | | |
|---|---|---|---|
| 7,493,650 B2 * | 2/2009 | Peled ...................... | G06F 21/10 726/1 |
| 9,648,040 B1 * | 5/2017 | Morkel ................... | H04L 63/20 |
| 9,961,115 B2 * | 5/2018 | Dalton ................... | H04L 63/102 |
| 2008/0172412 A1 * | 7/2008 | Gruhl ...................... | G06Q 10/00 |
| 2009/0240576 A1 * | 9/2009 | Rothrock ............... | G06Q 30/02 705/14.4 |
| 2010/0112540 A1 * | 5/2010 | Gross ...................... | G09B 5/10 434/351 |
| 2010/0125911 A1 * | 5/2010 | Bhaskaran ............. | G06Q 10/10 726/23 |
| 2011/0184982 A1 * | 7/2011 | Adamousky ............ | G06F 21/55 707/776 |
| 2011/0209192 A1 * | 8/2011 | LeClerc Greer ........ | G06F 21/32 726/1 |
| 2011/0209194 A1 * | 8/2011 | Kennedy ................. | H04L 63/20 726/1 |
| 2013/0246995 A1 * | 9/2013 | Ferrao ..................... | G06F 21/54 717/104 |
| 2013/0290202 A1 * | 10/2013 | Nunnery ................ | G06Q 50/01 705/319 |
| 2014/0156748 A1 * | 6/2014 | Allen ..................... | G06Q 10/10 709/204 |
| 2014/0207724 A1 * | 7/2014 | Ledenev ............... | G06F 21/316 706/47 |
| 2014/0359691 A1 * | 12/2014 | Woods .................... | H04L 63/20 726/1 |

(Continued)

*Primary Examiner* — Ramy M Osman
(74) *Attorney, Agent, or Firm* — Schwegman Lundberg & Woessner, P.A.

(57) ABSTRACT

The embodiments of the present disclosure discussed herein may be used to help monitor certain regulated professionals on an online social network for compliance with various regulatory standards and to enforce and remediate instances of possible noncompliance. The embodiments of the present disclosure can also help filter through activities irrelevant to a member's compliance and provide an archived history of a user's activities for regulators to review.

18 Claims, 8 Drawing Sheets

(56) References Cited

U.S. PATENT DOCUMENTS

| | | | |
|---|---|---|---|
| 2015/0127450 A1* | 5/2015 | Howe | G06Q 30/0248 |
| | | | 705/14.47 |
| 2015/0249906 A1* | 9/2015 | Thomas | H04W 4/027 |
| | | | 455/418 |
| 2016/0078203 A1* | 3/2016 | Moloian | H04L 63/101 |
| | | | 726/17 |
| 2016/0088021 A1* | 3/2016 | Jayanti Venkata | H04L 67/02 |
| | | | 726/1 |
| 2016/0092685 A1* | 3/2016 | Tse | G06F 21/6218 |
| | | | 726/1 |
| 2016/0189196 A1* | 6/2016 | Huh | G06Q 30/0231 |
| | | | 705/14.31 |
| 2016/0330084 A1* | 11/2016 | Hunter | H04L 51/32 |
| 2017/0026514 A1* | 1/2017 | Dwyer | G06F 17/2765 |
| 2017/0041454 A1* | 2/2017 | Nicholls | H04L 67/22 |
| 2018/0040019 A1* | 2/2018 | Gavlovski | G06F 17/30867 |

* cited by examiner

US 10,440,134 B1

SYSTEMS AND METHODS FOR COMPLIANCE ENFORCEMENT IN INTERNET-BASED SOCIAL NETWORKS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright LinkedIn, All Rights Reserved.

BACKGROUND

An Internet-based social networking service is a web-based service that enables users to establish links or connections with persons for the purpose of sharing information with one another. Some social network services aim to enable friends and family to communicate and share with one another, while others are specifically directed to business users with a goal of facilitating the establishment of professional networks and the sharing of business information.

For purposes of the present disclosure, the terms "social network" and "social networking service" are used in a broad sense and are meant to encompass services aimed at connecting friends and family (often referred to simply as "social networks"), as well as services that are specifically directed to enabling business people to connect and share business information (also commonly referred to as "social networks" but sometimes may be referred to as "business networks" or "professional networks").

Online social network platforms (also referred to herein as Internet-based social networks) provide a variety of information and content to users of the social network, such as articles on various topics, updates related to a user and individuals within the user's network, job opportunities and other advertisements, news stories, and the like. To help ensure the content within a user's social network feed (or other content delivery platform) is of interest to the user and reaches a wide selection of users, embodiments of the present disclosure match content with particular users within the social network and expand the audience for content by identifying additional users.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In the following, a detailed description of examples will be given with references to the drawings. It should be understood that various modifications to the examples may be made. In particular, elements of one example may be combined and used in other examples to form new examples. Many of the examples described herein are provided in the context of a social or business networking website or service. However, the applicability of the embodiments in the present disclosure are not limited to a social or business networking service.

Internet-based social networks continue to grow in popularity with members from a wide variety of different fields and professions. In some cases, the activity of social network members who are bankers, stock brokers and investment advisers (as well as other professionals) may be bound by various regulations. However, not all conduct by a member may be of interest to regulators (e.g., personal messages, job searching activities, etc.). Furthermore, online social networks typically provide a variety of different services (e.g., electronic messaging, activity within the member's feed, group activity, etc.) thus making it difficult to monitor what a particular regulated member is doing on a social network.

Embodiments of the present disclosure discussed herein may be used to help monitor certain regulated professionals on an online social network for compliance with various regulatory standards and to enforce and remediate instances of possible noncompliance. The embodiments of the present disclosure can also help filter through activities irrelevant to a member's compliance and provide an archived history of a user's activities for regulators to review.

Figure 1:
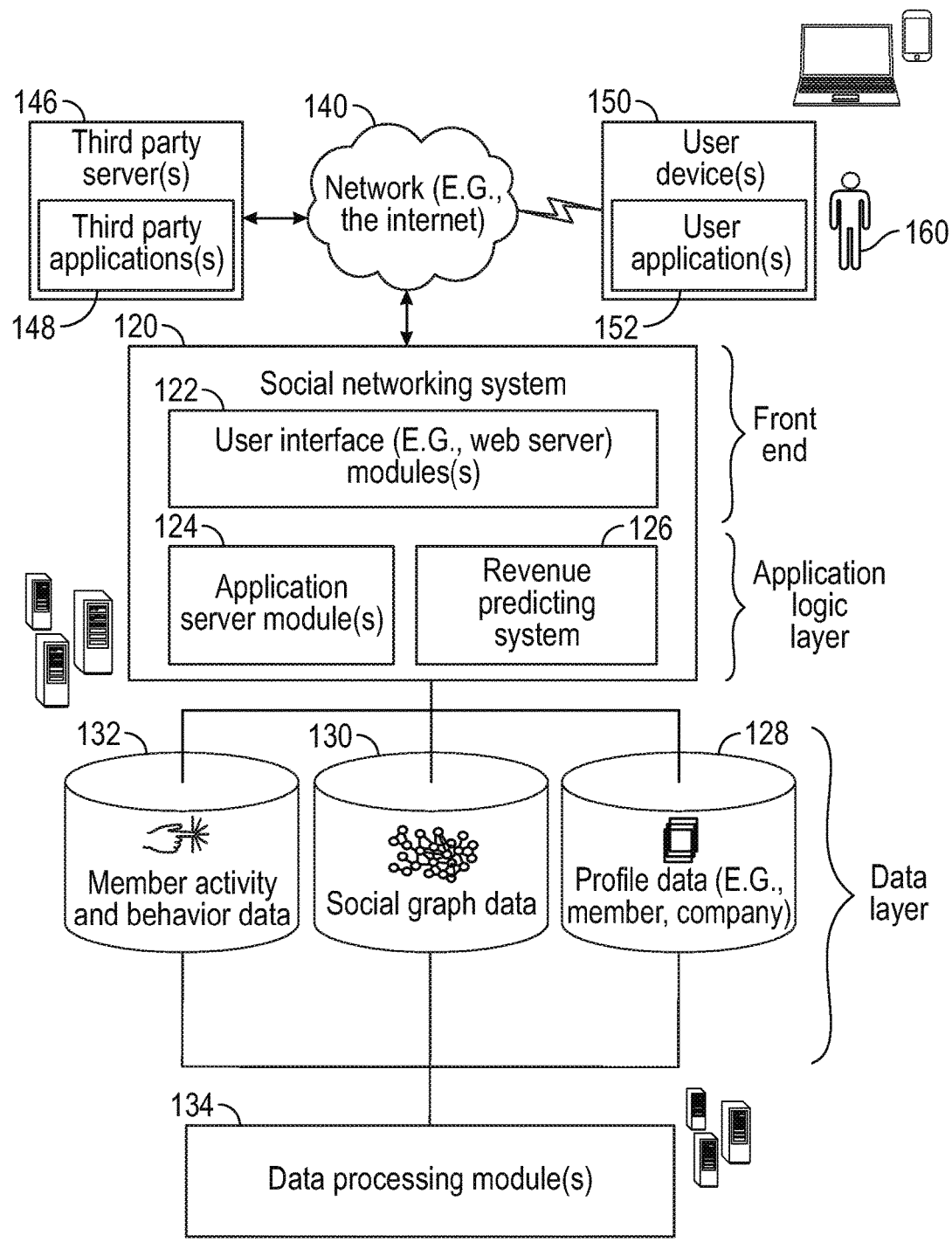
FIG. 1 is a block diagram illustrating a client-server system, according to various exemplary embodiments.

FIG. 1 illustrates an exemplary client-server system that may be used in conjunction with various embodiments of the present disclosure. The social networking system 120 may be based on a three-tiered architecture, including (for example) a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. Various additional functional modules and engines may be used with the social networking system illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the embodiments of the present disclosure are not limited to such architecture.

As shown in FIG. 1, the front end layer consists of a user interface module(s) (e.g., a web server) 122, which receives content requests from various computing devices including one or more user computing device(s) 150, and communicates appropriate responses to the requesting device. For example, the user interface module(s) 122 may receive requests in the form of Hypertext Transport Protocol (HTTP) requests, or other web-based, application programming interface (API) requests. The user device(s) 150 may be executing conventional web browser applications and/or applications (also referred to as "apps") that have been developed for a specific platform to include any of a wide variety of mobile computing devices and mobile-specific operating systems.

For example, user device(s) 150 may be executing user application(s) 152. The user application(s) 152 may provide functionality to present information to the user and communicate via the network 140 to exchange information with the social networking system 120. Each of the user devices 150 may comprise a computing device that includes at least a display and communication capabilities with the network 140 to access the social networking system 120. The user devices 150 may comprise, but are not limited to, remote devices, work stations, computers, general purpose computers, Internet appliances, hand-held devices, wireless devices, portable devices, wearable computers, cellular or mobile phones, personal digital assistants (PDAs), smart phones, smart watches, tablets, ultrabooks, netbooks, laptops, desktops, multi-processor systems, microprocessor-based or programmable consumer electronics, game consoles, set-top boxes, network PCs, mini-computers, and the like. One or more users 160 may be a person, a machine, or other means of interacting with the client device(s) 150. The user(s) 160 may interact with the social networking system 120 via the user device(s) 150. The user(s) 160 may not be part of the networked environment, but may be associated with user device(s) 150.

As shown in FIG. 1, the data layer includes several databases, including a database 128 for storing data for various entities of a social graph. In some exemplary embodiments, a "social graph" is a mechanism used by an online social networking service (e.g., provided by the social networking system 120) for defining and memorializing, in a digital format, relationships between different entities (e.g., people, employers, educational institutions, organizations, groups, etc.). Frequently, a social graph is a digital representation of real-world relationships. Social graphs may be digital representations of online communities to which a user belongs, often including the members of such communities (e.g., a family, a group of friends, alums of a university, employees of a company, members of a professional association, etc.). The data for various entities of the social graph may include member profiles, company profiles, educational institution profiles, as well as information concerning various online or offline groups. Of course, with various alternative embodiments, any number of other entities may be included in the social graph, and as such, various other databases may be used to store data corresponding to other entities.

In some embodiments, when a user initially registers to become a member of the social networking service, the person is prompted to provide some personal information, such as the person's name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 128.

Once registered, a member may invite other members, or be invited by other members, to connect via the social networking service. A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases. As members interact with various applications, content, and user interfaces of the social networking system 120, information relating to the member's activity and behavior may be stored in a database, such as the database 132.

The social networking system 120 may provide a broad range of other applications and services that allow members the opportunity to share and receive information, often customized to the interests of the member. For example, with some embodiments, the social networking system 120 may include a photo sharing application that allows members to upload and share photos with other members. With some embodiments, members of the social networking system 120 may be able to self-organize into groups, or interest groups, organized around a subject matter or topic of interest. With some embodiments, members may subscribe to or join groups affiliated with one or more companies. For instance, with some embodiments, members of the social networking service may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of the database 130. In some exemplary embodiments, members may receive advertising targeted to them based on various factors (e.g., member profile data, social graph data, member activity or behavior data, etc.)

The application logic layer includes various application server module(s) 124, which, in conjunction with the user interface module(s) 122, generates various user interfaces with data retrieved from various data sources or data services in the data layer. With some embodiments, individual application server modules 124 are used to implement the functionality associated with various applications, services, and features of the social networking system 120. For instance, a messaging application, such as an email application, an instant messaging application, or some hybrid or variation of the two, may be implemented with one or more application server modules 124. A photo sharing application may be implemented with one or more application server modules 124. Similarly, a search engine enabling users to search for and browse member profiles may be implemented with one or more application server modules 124.

Further, as shown in FIG. 1, a data processing module 134 may be used with a variety of applications, services, and features of the social networking system 120. The data processing module 134 may periodically access one or more of the databases 128, 130, and/or 132, process (e.g., execute batch process jobs to analyze or mine) profile data, social graph data, member activity and behavior data, and generate analysis results based on the analysis of the respective data. The data processing module 134 may operate offline. According to some exemplary embodiments, the data processing module 134 operates as part of the social networking system 120. Consistent with other exemplary embodiments, the data processing module 134 operates in a separate system external to the social networking system 120. In some exemplary embodiments, the data processing module 134 may include multiple servers of a large-scale distributed storage and processing framework, such as Hadoop servers, for processing large data sets. The data processing module 134 may process data in real time, according to a schedule, automatically, or on demand. In some embodiments, the data processing module 134 may perform (alone or in conjunction with other components or systems) the functionality of method 200 depicted in FIG. 2 and described in more detail below.

Additionally, a third party application(s) 148, executing on a third party server(s) 146, is shown as being communicatively coupled to the social networking system 120 and the user device(s) 150. The third party server(s) 146 may support one or more features or functions on a website hosted by the third party.

In some exemplary embodiments, the third party server(s) 146 may comprise one or more computing devices of a client or customer of the online social network seeking to monitor and/or enforce compliance of a member (e.g., a user 160) of the social network with a set of regulations. The social networking system 120 and/or third party devices 146 may (alone or together) perform various functionality to monitor and regulate enforcement of a member's activity.

Figure 2:
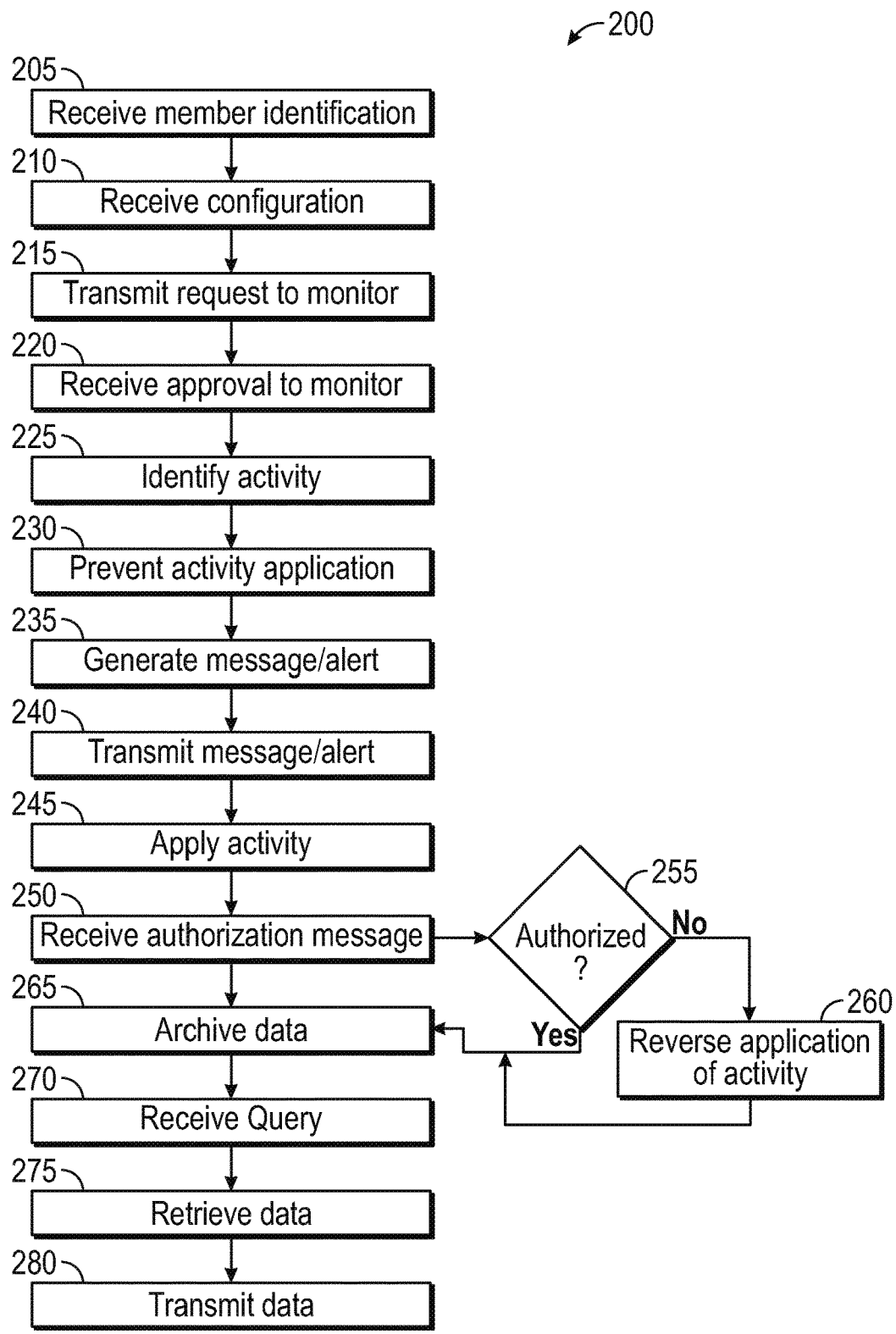
FIG. 2 is a flow diagram of an exemplary method according to various exemplary embodiments.

FIG. 2 illustrates an exemplary method 200 for monitoring and enforcing compliance of a member of an online social network according to various aspects of the present disclosure. Embodiments of the present disclosure may practice the steps of method 200 in whole or in part, and in conjunction with any other desired systems and methods. The functionality of method 200 may be performed, for example, using any combination of the systems depicted in FIGS. 1, 3, and/or 4.

In this example, method 200 includes receiving an identification of a member of an Internet-based social network to monitor for compliance with a rule (205), receiving configuration information for monitoring the member (210), transmitting a request to monitor the member (215), and receiving approval to monitor the member (220). Method 200 further includes identifying an activity associated the rule (225), preventing application of the activity to the social network (230), generating (235) and transmitting (240) a message or alert. Application of the activity (245) may occur prior to authorization (255) and reversed (260) if not authorized, or application (245) may be contingent on receiving authorization (255).

Method 200 further includes archiving data associated with the activity (265), receiving a query for a member's activity data (270), and retrieving (275) and transmitting (280) the retrieved activity data.

Embodiments of the present disclosure may receive the identification of a member (205) from a variety of sources, such as over a network 140 (such as the Internet) from a third party computing device or server 146 of a client (such as a regulatory authority or the member's employer) seeking to monitor and/or enforce compliance of the member's activity on the social network. The member may be identified based on a variety of criteria, such as the member's name, an organization to which the member belongs (e.g., the member's company), a unique identifier associated with the member (e.g., an identifier for the member with a regulatory association or agency), and other information.

Configuration information for use in monitoring the member of the social network can likewise be received (210) from a variety of sources and may contain a variety of rules and other content. In some exemplary embodiments, the configuration information is received from the client seeking to monitor and/or enforce compliance of the member's activity on the social network introduced above. The configuration information may specify, for example, the types of activities of the member to monitor, such as the creation of content, modification of content, and/or deletion of content on the online social network. The configuration information may be received in the form of a configuration file from the third-party computing device 146 of the client of the social network 120 (e.g., over the Internet 140). Alternatively, the system may generate a configuration file based on information received from the client as well as other sources. The content of the configuration file may be automatically updated as conditions change, such as the adoption or modification of rules in a particular regulatory standard, to help the system monitor and enforce compliance of the members of the social network in real-time or near-real-time.

The system may transmit a request (215) to the identified member of the social network requesting the member's authorization to monitor the member's activity and receive (220) approval from the member to monitor the member's activity. Various embodiments may provide the monitored member with some or all of the data provided to third party monitors (e.g., the member's employer or a monitoring agency) regarding the member's activities so that the member is aware of any activities that may be potentially non-compliant in the future. Embodiments of the present disclosure can thus help provide feedback and education to members (tailored specifically to the member's actions) who may not be familiar with one or more compliance rules. Among other things, this not only apprises the member and third parties of potential compliance violations, but helps prevent future violations by the member.

Figure 5:
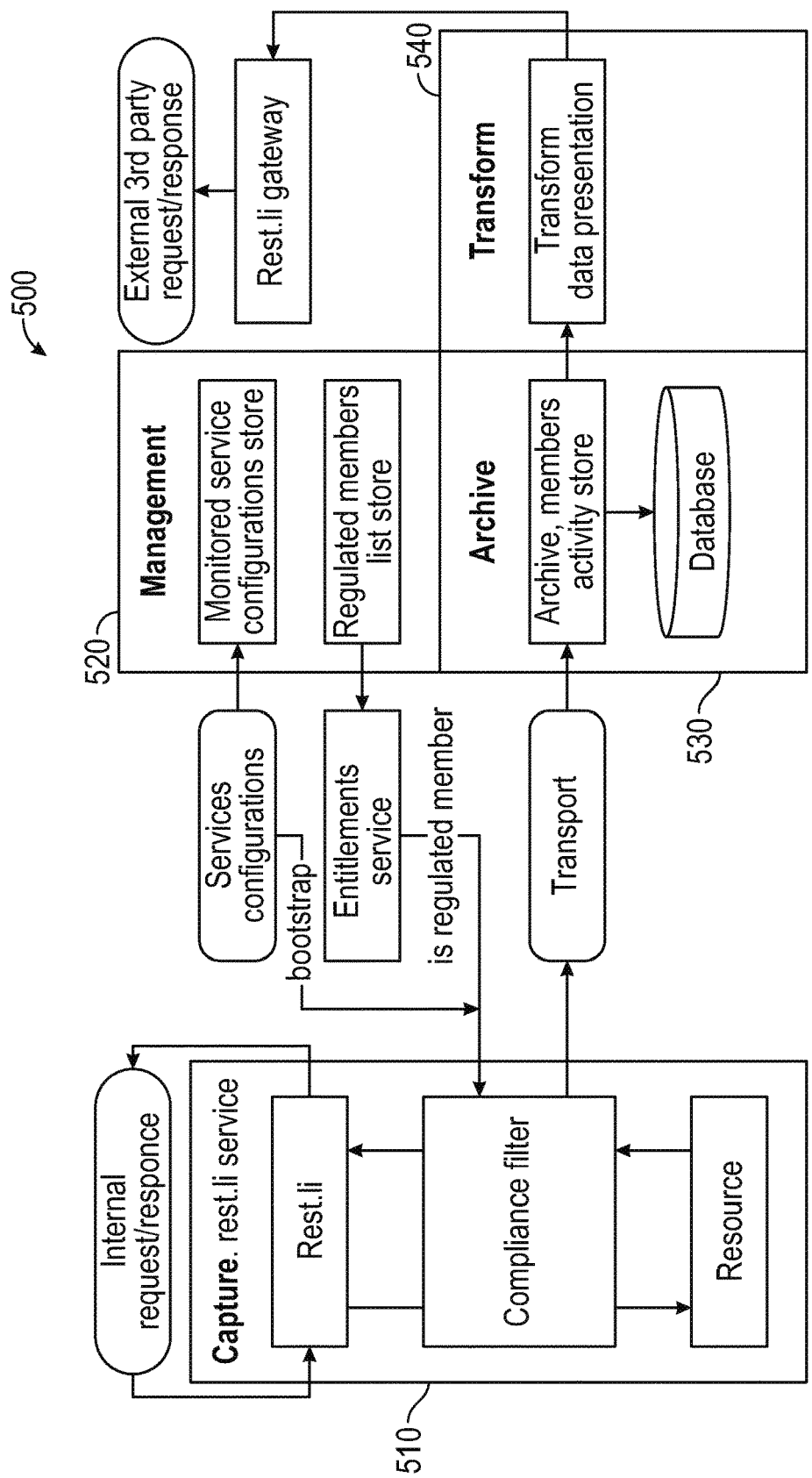
FIG. 5 illustrates an exemplary functional model and flow diagram illustrating various aspects of the present disclosure.

FIG. 5 illustrates an exemplary functional model and flow diagram illustrating various aspects of the present disclosure. The functional components in this model may be implemented in software, hardware, or a combination thereof. In this example, model 500 includes components for capturing and analyzing activity for monitored/regulated members 510, managing configurations for monitored members 520, archival of data 530, and transformation of data 540. In block 510, the system monitors activity by the monitored member (e.g., "write operation" traffic) and captures regulated members' changes to the social network. The "rest.li" service filter monitors only the members defined in a service's configuration (i.e., only members identified for monitoring/regulation). The "Compliance filter" component monitors activities ("Resources") and excludes any activities outside the scope of the monitoring (e.g., communications of a personal nature, job search activity by the member, etc.).

The Capture component 510 may include an archiving client (e.g., created using a RESTLI JAVA framework) that intercepts incoming calls for Create, Update & Delete methods and captures data for those activities. The collected data is sent though a transport mechanism (e.g., KAFKA) to the Archive component 530 which processes and stores the captured data for further use. In this example, each client provides a 'config' file (or information for generating such a file) specifying version, resource schema, fields to expose, fields to decorate, and other information. On startup, the client registers its config file with the Management system 520, to be used while sending data to the server.

At the startup of the monitoring service, the Capture component 510 may prevent the monitoring service from starting if it detects an invalid configuration. In case of error during run time, the system may block further operation of the monitoring service or, in the alternative, allow the monitoring service to continue but report the errors immediately to an operator of the social network system 120 or a third party.

Figure 6:
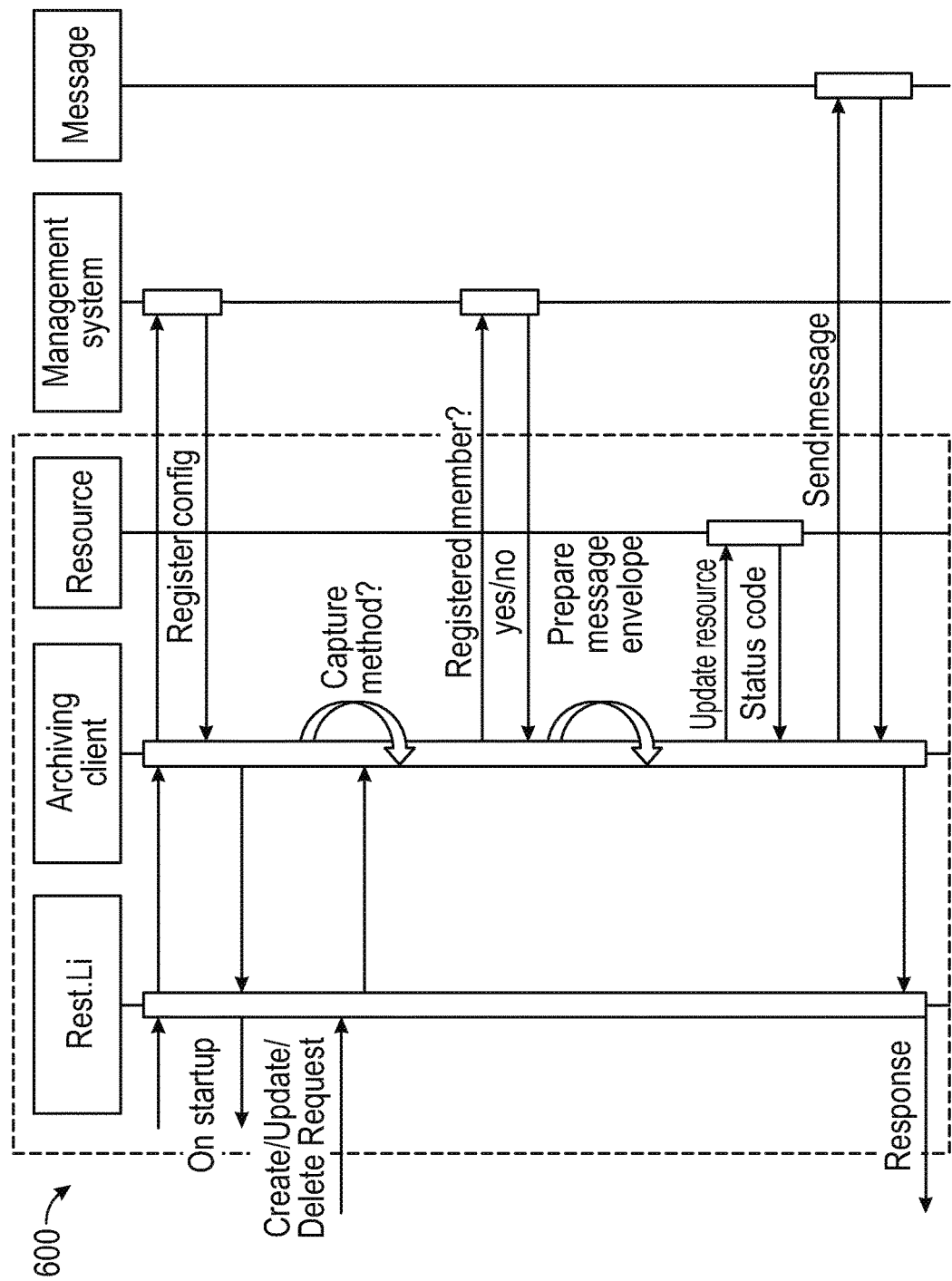
FIG. 6 illustrates an exemplary process flow 600 of the model 500 in FIG. 5.

FIG. 6 illustrates an exemplary process flow 600 of the model 500 in FIG. 5. In this example, the system the REST.LI outgoing responses (i.e., create, update, delete) and determines if the activity is a "write operation" that should be monitored based on the configuration information for the monitored member. The system further checks to verify if the activity is related to a monitored/regulated member. If the activity is identified as associated with a compliance rule and is associated with a monitored member, the system sends data related to the activity to archiving system via the transport component.

The system may analyze the activity of a member to determine whether the content of the member's activity matches any criteria identified in the configuration file for activity that should be monitored. For example, a regulated member of the social network who works in the financial industry may have certain restrictions on posting his/her opinions of the financial status of a particular company. In such a case, the system may analyze the content of posts by the member to the member's social network feed to determine whether the posts contain any content that may be potentially non-compliant with one or more rules governing the member's conduct. As described in more detail below, application of such posts (or other activity) may be prevented (e.g., for a predetermined period of time or pending authorization from the client or other authority). Additionally or alternatively, application of such activity may be reversed (e.g., posts removed from the user's feed) based on a determination of non-compliance.

As introduced above, some activity by the monitored member may not be relevant to the monitoring or enforcement of compliance, and such activity may be excluded from monitoring, reporting, and/or archiving (e.g., by the "Compliance filter" in component 510 of FIG. 5. For example, communications of a personal nature by the member with other members of the social network using an electronic messaging system may be excluded. Likewise, posts or messages by the member regarding employment opportunities may be excluded. Activities may be included or excluded by performing a text analysis and/or image recognition process on content associated with the activity. For example, activities containing text, images, video, and other content that may potentially be associated with non-compliant behavior by the member may be identified in a message or alert transmitted to the computing device of the client.

The "Management" component 520 of FIG. 5 maintains a list of regulated members of the social network, maintains service configuration information, and supports versioning of various configurations. The configuration information may identify activities of the member based on different types of services on the social network. For example, a client may wish to monitor the service handling posts to a user's feed by the user. The system may also monitor all messages sent or received by the member using the social network's electronic messaging system. In some embodiments, authorization (255) of a monitored member's activity may be left to a third party (e.g., monitoring agency) to determine based on the electronic messages and alerts transmitted (240) by the system, as well as based on activity data requested (270) by the third party.

In other embodiments, the system may analyze activities of the member to determine whether the activity is potentially non-compliant with regards to one or more rules and help enforce compliance with such rules. Such rules may be identified (in whole or in part) via the configuration information (e.g., in the configuration file provided by the client). In some exemplary embodiments, the configuration information may provide a reference to a compliance standard, and the system is adapted to automatically retrieve the compliance standard (e.g., over the Internet) and compare the member's activity to the rules in the compliance standard. In this manner, potentially non-compliant behavior by the member can be quickly identified without requiring the client or another party to manually identify activities of the member that should be monitored. Moreover, changes to the compliance standard can be identified and easily adopted by the system in real-time or near-real-time, thus helping to ensure the member's conduct is monitored in accordance with the latest version of the rules standard.

In some embodiments, the system may monitor all activity by a user that matches criteria in the configuration information (regardless of whether such activity is compliant) and provide messages/alerts to a third party device (such as the computing device of the client) to determine whether application of the activity should be blocked, allowed, reversed, archived, etc. In addition or alternatively, the system may archive the activity of a monitored member over a predetermined period of time (e.g., a day, a week, etc.) and provide a report to the third party identifying the member's activity over the period. Such information may also be retrieved in response to a query for such information by the client device or other third party.

Embodiments may enforce compliance rules for the activities of monitored members. For example, the application of activities by the monitored member may be prevented (230) for a predetermined period of time and/or until authorized by the system or a third party. In some exemplary embodiments, the system intercepts activity by a monitored member and delays application of the activity to the social network. For example, a monitored member may create a post to the member's feed and submit it to the system for display. The system may display the post on the monitored member's own view of the feed, but abstain from distributing (or otherwise making visible) the post to other members of the social network for a predetermined time period and/or until the post is approved. Alternatively, application of the post may be withheld from both the monitored member's feed and all other member's feeds. Likewise, delivery of an electronic message generated by the monitored member may be delayed. In such cases, approval or authorization of a monitored member's activity may be determined by the system (e.g., based on compliance rules identified in the configuration file/information), performed by a third party and transmitted to the system (e.g., in response to a request for authorization in an electronic message/alert), or based on a combination of the two.

The system may generate (235) an electronic message, alert, or other communication regarding one or more activities by the monitored member and transmit (240) such communications to one or more devices or systems. Referring again to FIG. 5, embodiments of the present disclosure may transform data (e.g., using "Transform" component 520) regarding the activities of a monitored/regulated member as needed to fulfill the requests of third parties (such as a client monitoring service). The "data presentation" subcomponent of block 540 provides external user's with set of application programming interfaces (APIs) to access compliance activities. The system may also provide a set of utility APIs such as set red/unread flags, activities data structure, etc.

In an exemplary embodiment, the social networking system 120 may generate (235) an electronic message containing data associated with a monitored member's activity (or the activity for multiple monitored members) and transmit the electronic message (240) to a third party computing device 146 via the Internet 140. In some embodiments, the electronic message comprises an alert than an activity attempted (or taken) by a monitored member is potentially non-compliant with one or more rules. The electronic message/alert may also include a request by the system for the third party to authorize an activity by the monitored member.

Any desired data associated with a monitored member's activity may be included in an electronic message or alert, such as a unique identifier for an activity, a time/date an activity occurred, an identifier for the monitored member, information regarding a service of the social network associated with the activity (e.g., an electronic messaging service), and other data.

In some exemplary embodiments, the activity of a monitored member may be applied (245) to the social network prior to receiving or determining authorization (255) for the activity. In such cases, a member's activity that is flagged as being potentially non-compliant can be applied (245) and later reversed (260) in response to a determination (by the system or received from a third party, such as the client) that the activity is non-compliant. As discussed above, the activity may be temporarily prevented (230) to provide the system or third party time to determine compliance of the activity. In other embodiments, application of the activity is prevented (230) indefinitely, unless and until authorized (255).

The system may archive data (265) related to the activities of monitored members, in a variety of different ways. Referring again to the example model in FIG. 5, the Archive component 530 validates and decorates member's activity, and stores processed and decorated activity data and metadata in the Database. The system also keeps information about errors and maintains reference to "unprocessed activities" used to recover data (e.g., a share process unable to complete).

The Management component 520 in FIG. 5 utilizes APIs to manage the list of regulated members for internal and external integrations. The management component 520 may also support requests for members to opt in or out of the monitoring service, as described above with reference to steps (215) and (220) from FIG. 2 above. In one exemplary embodiment, the system uses an authorization framework to create a customizable dialog that explains the opt in/out process to a member identified for monitoring. The management component 520 may utilize internal APIs to perform checks to see if a member is a regulated/monitored member. Additionally, management component 520 maintains lists of all configurations, configuration names and versions of configurations. The configuration information maintained by the system may define a data structure associated with an activity to be captured, archived, and/or regulated/enforced.

Figure 8:
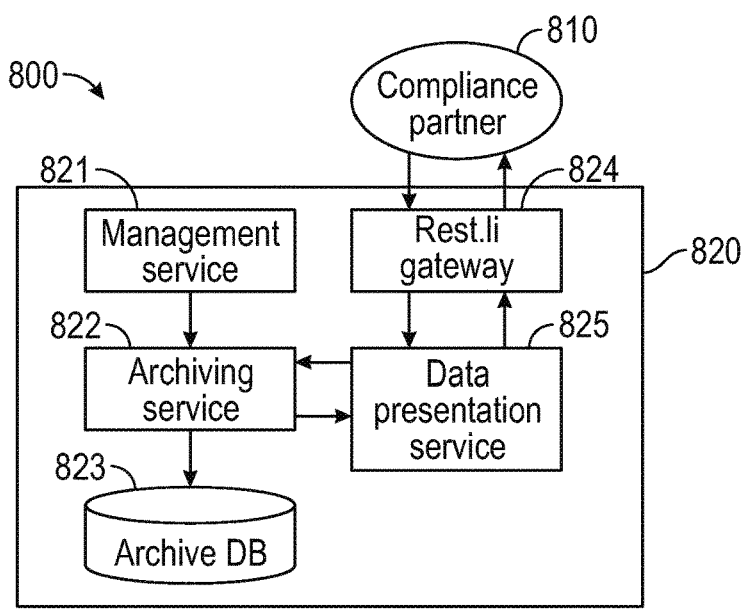
FIG. 8 is a block diagram further illustrating the functionality of the model depicted in FIG. 5.

FIG. 8 is a block diagram further illustrating the functionality of the model depicted in FIG. 5. In this example, the management service 821 interfaces with the archiving service 822, archive database 823, and data presentation service 825 to receive member identification/registration information and configuration information from a third party (i.e., compliance partner 810) and to provide data related to the identified member's activities to the compliance partner 810. As introduced above, the management service 821 registers a member for compliance tracking (e.g., pending member authorization for the compliance partner 810 or the social network system to make compliance tracking calls on their behalf). Management service 821 also checks to see if a member is regulated or not, manages configuration information related to the regulated members and activities, as well as data archival and retrieval.

Figure 9:
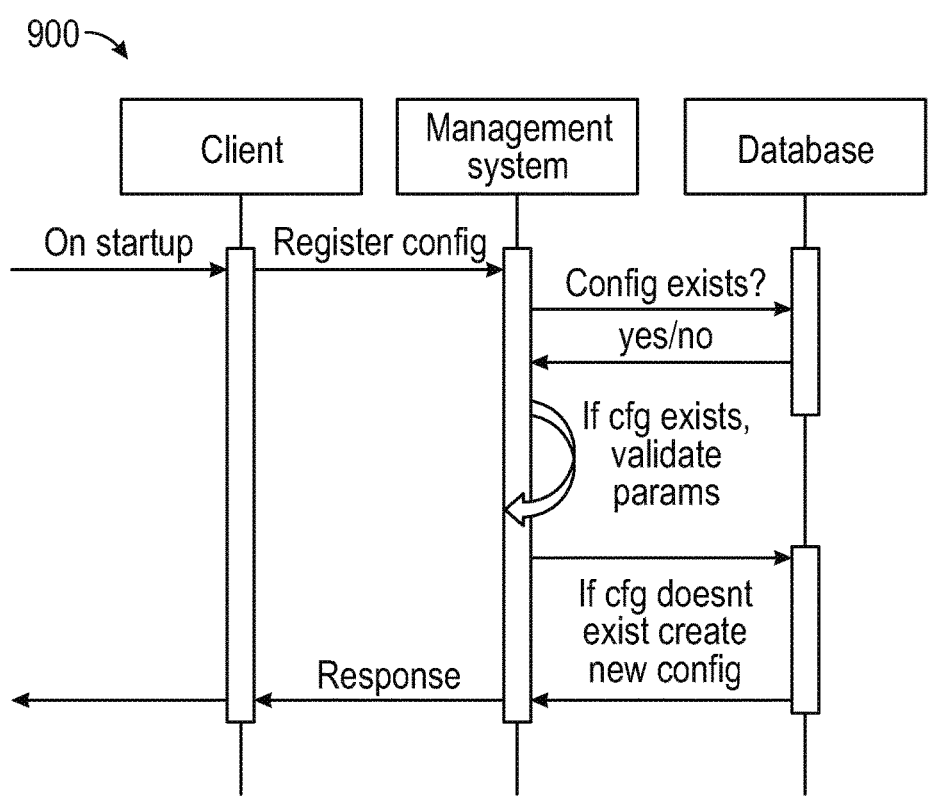
FIG. 9 illustrates an exemplary process 900 for registering a member for monitoring.

FIG. 9 illustrates an exemplary process 900 for registering a member for monitoring. In this example, the archiving client registers its configuration file with the Management system. If the configuration file already exists, the parameters of the configuration file are validated, otherwise a new configuration file is created. The configuration file has the fields: Service name (name of service emitting member activity message); Config version (version of configuration file); and Activities (list of member activity events emitted by service).

For each activity, the configuration file further includes: Schema (the schema of the data that will be sent from client to 'Archiving system' and that will be used for deserializing messages for that activity type); Methods to intercept (including a member identification field for the member who initiated the activity, keys for the intercepted call, and additional parameters to be captured for the intercepted call); Capture fields (specifying a list of fields of the schema that are exposed to external consumer); Decorate Fields (specifying which fields in the schema need to be decorated.

In some exemplary embodiments, an event type associated with an activity of a member is determined and a configuration entry associated with the determined event type retrieved from a configuration file. The data is then archived based on the configuration entry. The configuration entry may include a variety of data and rules for archiving the data for an identified activity associated with a monitored member, such as schema for deserializing the data associated with the identified activity, a list of fields to be captured from the data associated with the identified activity, and a list of fields to be decorated from the data associated with the identified activity.

Figure 7:
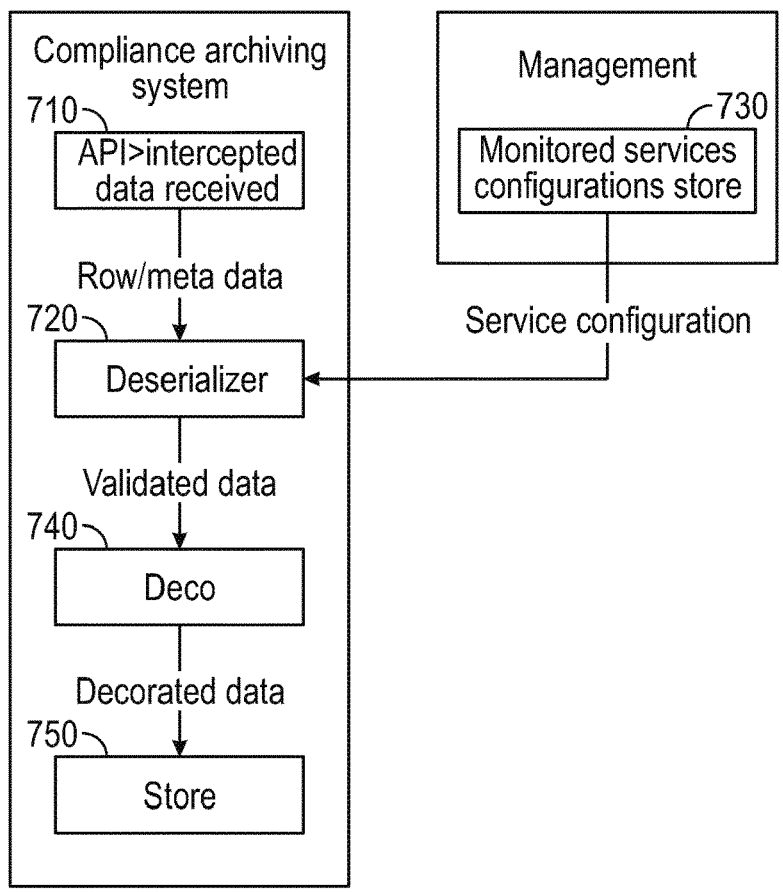
FIG. 7 is an exemplary flow diagram showing the functionality of the Archive component 530 in FIG. 5.

FIG. 7 is an exemplary flow diagram showing the functionality of the Archive component 530 in FIG. 5. In this example, the data intercepted via the Capture component 510 is received via the Transport component (710). The system retrieves the client configuration entry corresponding to the type of event associated with the activity from the Management component 520 (730). In this example, the configuration entry includes schema to use for deserializing data associated with the activity, a list of fields to be captured, and a list of fields to be decorated.

The activity data is deserialized and the system validates data structure and fields (720). The system decorates (740) the data fields of the activity data based on the configuration information. For example, the configuration file may identify data fields for decoration such as: member, industry, company, occupation, degree, field of study, school, skill, location, etc. In this context, "decorating" a data field may include any addition, removal, modification, and/or formatting of information in the field. The decorated activity data is stored (750) to a data store, such as a database.

In some embodiments, the configuration file may include executable software code for archiving the data, and the system is adapted to run the executable code to archive the data. The executable code may be object code, a script, compilable source code, or combinations thereof. In this manner, a third party client (such as a member's employer or a monitoring agency) can provide the specific code it wishes the system to use in archiving the data to conform to the client's standards and formatting needs. Moreover, multiple third parties can each provide their own archiving functionality for the system to use.

The system may further be adapted to identify errors associated with applying a monitored member's activity to the social network and including information about such errors in the data that is archived and/or transmitted in the electronic message or alert. The system may be adapted to detect and report errors such as: an unknown service or configuration version referenced in the client configuration information; an unsupported activity type (e.g., feed hasn't been configured in management system, unrecognized activity name, etc); the unavailability of a software component for the monitoring/enforcement service (e.g., the configuration management component is unavailable); database errors; activity data deserialization errors; activity data decoration errors; and projection errors (e.g., misconfigured projections in decoration).

Archived data may be retrieved (275) and transmitted (280) in response to a query (270) for the data. For example, the system 120 may receive a request over the Internet 140 from the computing device 146 of a third party client (such as a compliance monitoring agency) for information regarding the activity of one or more monitored members of the social network over a predetermined time period. In response to the request, the system retrieves the requested information (275) archived in a database and transmits the retrieved data to the computing device 146 of the client.

Receipt of data (such as the identification of members to identify and configuration information) and transmission of electronic messages, alerts, and data may be performed in a variety of different ways by embodiments of the present disclosure. In some exemplary embodiments, various data and messages may be transferred via an application programming interface (API). Data transmitted and received may also be encrypted.

Figure 3:
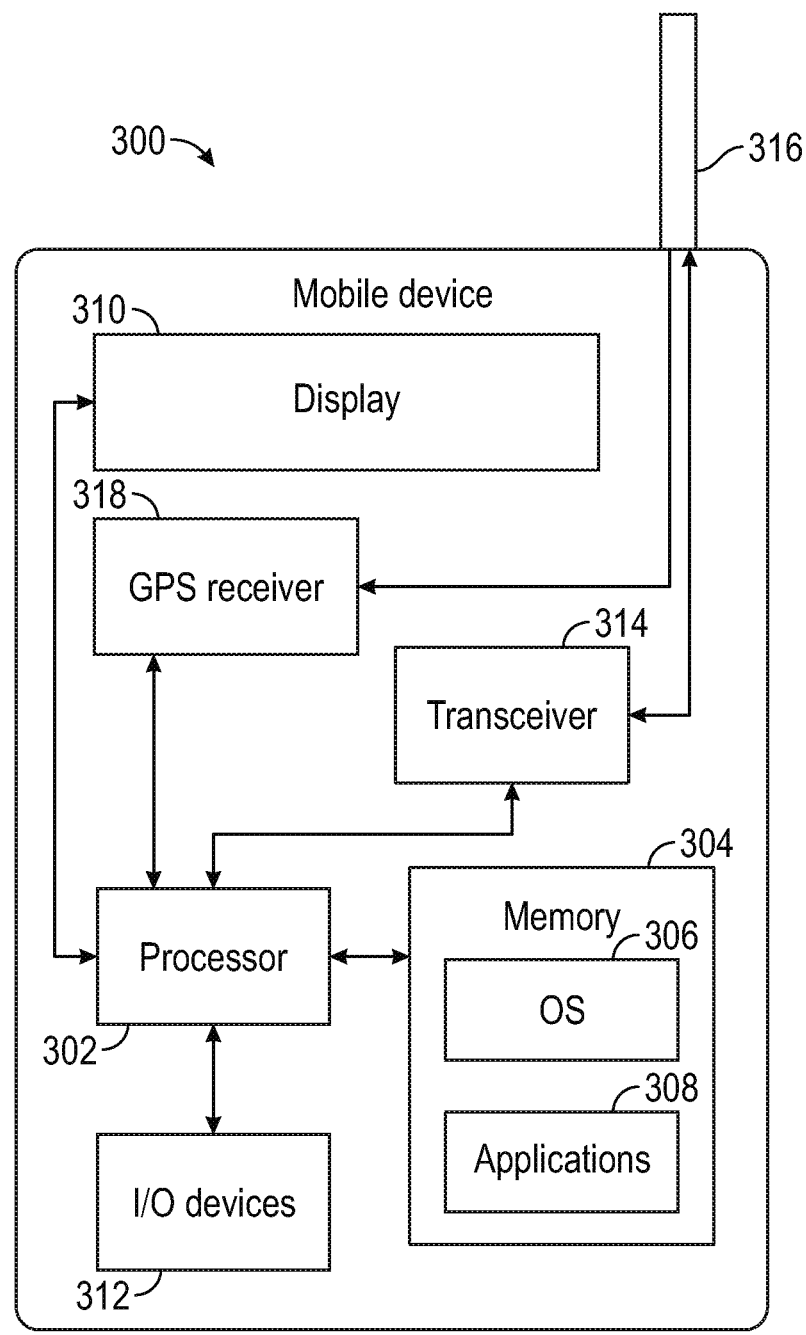
FIG. 3 is a block diagram illustrating an exemplary mobile device.

FIG. 3 is a block diagram illustrating a mobile device 300, according to an exemplary embodiment. The mobile device 300 may include a processor 302. The processor 302 may be any of a variety of different types of commercially available processors 302 suitable for mobile devices 300 (for example, an XScale architecture microprocessor, a microprocessor without interlocked pipeline stages (MIPS) architecture processor, or another type of processor 302). A memory 304, such as a random access memory (RAM), a flash memory, or other type of memory, is typically accessible to the processor 302. The memory 304 may be adapted to store an operating system (OS) 306, as well as application programs 308, such as a mobile location enabled application that may provide LBSs to a user. The processor 302 may be coupled, either directly or via appropriate intermediary hardware, to a display 310 and to one or more input/output (I/O) devices 312, such as a keypad, a touch panel sensor, a microphone, and the like. Similarly, in some embodiments, the processor 302 may be coupled to a transceiver 314 that interfaces with an antenna 316. The transceiver 314 may be configured to both transmit and receive cellular network signals, wireless data signals, or other types of signals via the antenna 316, depending on the nature of the mobile device 300. Further, in some configurations, a GPS receiver 318 may also make use of the antenna 316 to receive GPS signals.

Certain embodiments may be described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In exemplary embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors or processor-implemented modules, not only residing within a single machine, but deployed across a number of machines. In some exemplary embodiments, the one or more processors or processor-implemented modules may be located in a single location (e.g., within a home environment, an office environment or as a server farm), while in other embodiments the one or more processors or processor-implemented modules may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Exemplary embodiments may be implemented in digital electronic circuitry, or in computer hardware, firmware, software, or in combinations of them. Exemplary embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In exemplary embodiments, operations may be performed by one or more programmable processors executing a computer program to perform functions by operating on input data and generating output. Method operations can also be performed by, and apparatus of exemplary embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice.

Figure 4:
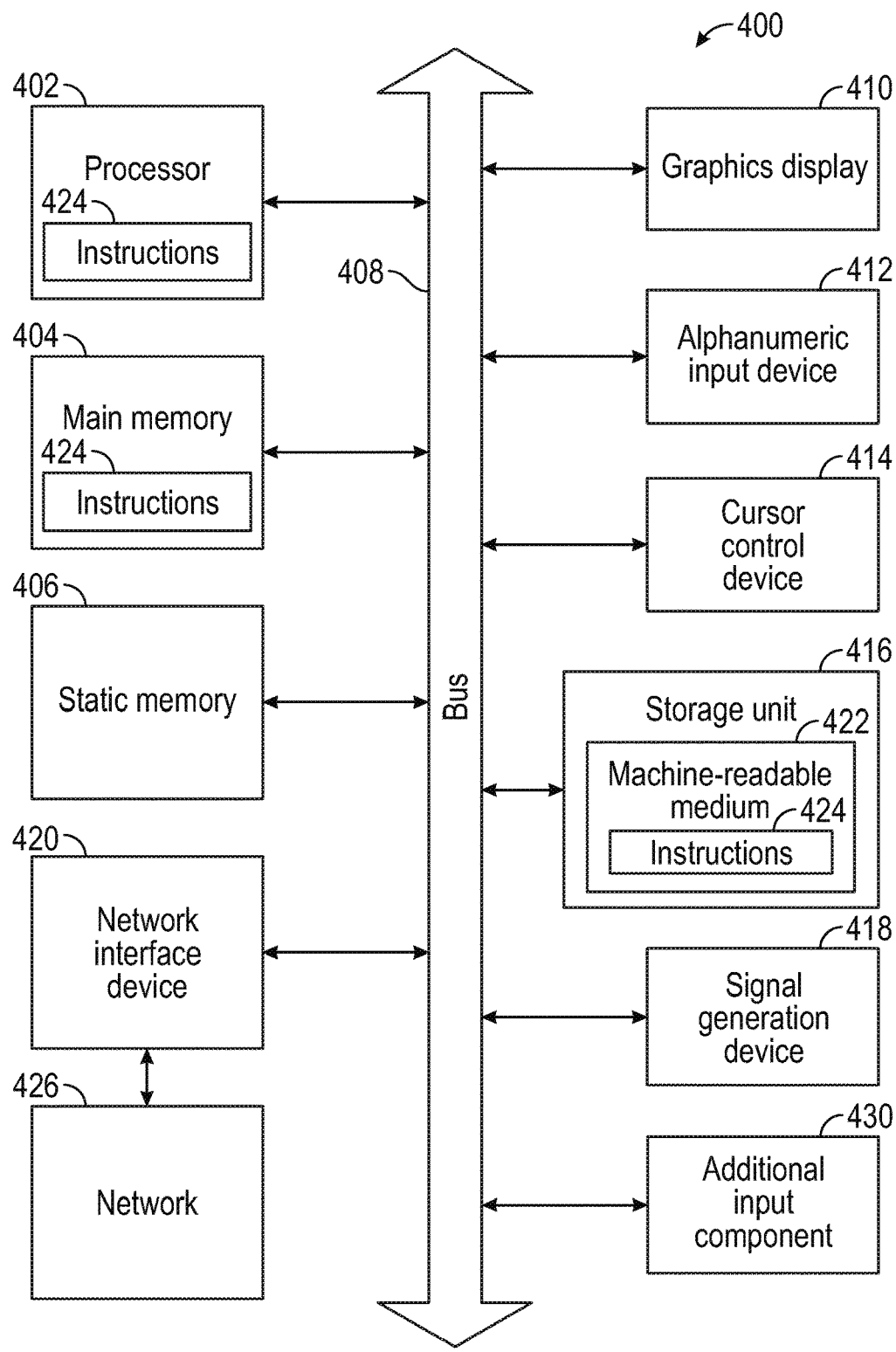
FIG. 4 is a block diagram illustrating components of an exemplary computer system.

FIG. 4 is a block diagram illustrating components of a machine 400, according to some exemplary embodiments, able to read instructions 424 from a machine-readable medium 422 (e.g., a non-transitory machine-readable medium, a machine-readable storage medium, a computer-readable storage medium, or any suitable combination thereof) and perform any one or more of the methodologies discussed herein, in whole or in part. Specifically, FIG. 4 shows the machine 400 in the example form of a computer system within which the instructions 424 (e.g., software, a program, an application, an applet, or other executable code) for causing the machine 400 to perform any one or more of the methodologies discussed herein may be executed, in whole or in part.

In alternative embodiments, the machine 400 operates as a standalone device or may be connected (e.g., networked) to other machines. In a networked deployment, the machine 400 may operate in the capacity of a server machine or a client machine in a server-client network environment, or as a peer machine in a distributed (e.g., peer-to-peer) network environment. The machine 400 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 424, sequentially or otherwise, that specify actions to be taken by that machine. Further, while only a single machine is illustrated, the term "machine" shall also be taken to include any collection of machines that individually or jointly execute the instructions 424 to perform all or part of any one or more of the methodologies discussed herein.

The machine 400 includes a processor 402 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 404, and a static memory 406, which are configured to communicate with each other via a bus 408. The processor 402 may contain microcircuits that are configurable, temporarily or permanently, by some or all of the instructions 424 such that the processor 402 is configurable to perform any one or more of the methodologies described herein, in whole or in part. For example, a set of one or more microcircuits of the processor 402 may be configurable to execute one or more modules (e.g., software modules) described herein.

The machine 400 may further include a graphics display 410 (e.g., a plasma display panel (PDP), a light emitting diode (LED) display, a liquid crystal display (LCD), a projector, a cathode ray tube (CRT), or any other display capable of displaying graphics or video). The machine 400 may also include an alphanumeric input device 412 (e.g., a keyboard or keypad), a cursor control device 414 (e.g., a mouse, a touchpad, a trackball, a joystick, a motion sensor, an eye tracking device, or other pointing instrument), a storage unit 416, an audio generation device 418 (e.g., a sound card, an amplifier, a speaker, a headphone jack, or any suitable combination thereof), and a network interface device 420.

The storage unit 416 includes the machine-readable medium 422 (e.g., a tangible and non-transitory machine-readable storage medium) on which are stored the instructions 424 embodying any one or more of the methodologies or functions described herein. The instructions 424 may also reside, completely or at least partially, within the main memory 404, within the processor 402 (e.g., within the processor's cache memory), or both, before or during execution thereof by the machine 400. Accordingly, the main memory 404 and the processor 402 may be considered machine-readable media (e.g., tangible and non-transitory machine-readable media). The instructions 424 may be transmitted or received over the network 426 via the network interface device 420. For example, the network interface device 420 may communicate the instructions 424 using any one or more transfer protocols (e.g., hypertext transfer protocol (HTTP)).

In some exemplary embodiments, the machine 400 may be a portable computing device, such as a smart phone or tablet computer, and have one or more additional input components 430 (e.g., sensors or gauges). Examples of such input components 430 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 422 is shown in an exemplary embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 424 for execution by the machine 400, such that the instructions 424, when executed by one or more processors of the machine 400 (e.g., processor 402), cause the machine 400 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various exemplary embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The performance of certain operations may be distributed among the one or more processors, not only residing within a single machine, but deployed across a number of machines. In some exemplary embodiments, the one or more processors or processor-implemented modules may be located in a single geographic location (e.g., within a home environment, an office environment, or a server farm). In other exemplary embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are legally entitled.

What is claimed is:
1. A method comprising:
receiving, over the Internet by a computer system associated with an Internet-based social network, from a computing device of a third-party client external to the computer system, an identification of a member of the Internet-based social network to monitor for compliance with a rule associated with a compliance standard provided by the third-party client, the monitoring being of one or more members of the Internet-based social network;

identifying, by the computer system, an activity that is associated with the rule, the activity being requested to be performed by the monitored member on the Internet-based social network, the identifying of the activity being based on matching the activity requested to be performed and an activity specified in a configuration file, the configuration file providing the rule and one or more types of activities to be monitored, the configuration file being provided by the third-party client;

automatically determining, by the computer system based on the rule and the activity, that the activity is potentially non-compliant with the rule;

based on the determination of potential non-compliance of the activity preventing application of the activity to the Internet-based social network, and transmitting an alert to the computing device of the third-party client, the alert identifying the potentially non-compliant activity by the monitored member wherein the rule references the compliance standard, and wherein the identifying of the activity associated with the rule includes: retrieving the compliance standard by the computer system over the Internet; and comparing the activity to the retrieved standard.

2. The method of claim 1, wherein the preventing of the application of the activity to the Internet-based social network includes delaying application of the activity for a predetermined period of time.

3. The method of claim 1, wherein the alert includes a request for authorization for performing the identified activity, and wherein the method further includes:

receiving, by the computer system from the third-party client computing device, authorization to perform the identified activity; and performing the identified activity in response to the authorization to perform the identified activity.

4. The method of claim 1, further comprising:

applying, by the computer system, the identified activity to the Internet-based social network;

receiving, by the computer system from the third-party client computing device, a denial of authorization to perform the identified activity; and in response to the denial of authorization to perform the identified activity, reversing application of the identified activity on the Internet-based social network.

5. The method of claim 1, wherein the activity by the monitored member includes at least one of creation of content, modification of content, or deletion of content.

6. The method of claim 1, wherein the identifying of the activity associated with the rule includes retrieving, by the computer system, the configuration file listing the types of activities to be monitored.

7. The method of claim 6, wherein the identifying of the activity includes analyzing content associated with the activity and determining, based on the analysis, that the content matches one or more criteria identified in the configuration file.

8. The method of claim 6, wherein the configuration file identifies one or more services on the Internet-based social network to monitor, and wherein the identifying of the activity includes identifying an activity associated with the one or more identified services.

9. The method of claim 6, wherein the rule is identified in the configuration file.

10. The method of claim 1, wherein the data associated with the identified activity includes at least one of a unique identifier for the identified activity, a time the identified activity occurred, an identifier for the monitored member, or information regarding a service of the Internet-based social network associated with the identified activity.

11. The method of claim 1, further comprising archiving the data associated with the identified activity to a database in communication with the computer system.

12. The method of claim 11, wherein the archiving of the data associated with the identified activity includes:

determining, by the computer system, an event type associated with the identified activity;

retrieving, by the computer system, a configuration entry associated with the determined event type from the configuration file; and archiving the data associated with the identified activity based on the configuration entry.

13. The method of claim 12, wherein the configuration entry includes a schema for deserializing the data associated with the identified activity, a list of fields to be captured from the data associated with the identified activity, and a list of fields to be decorated from the data associated with the identified activity.

14. The method of claim 11, further comprising:

receiving, by the computer system from the computing device of the third-party client over the Internet, a query requesting activity for the member over a predetermined time period;

retrieving, from the database in response to the query, data associated with one or more monitored activities by the member during the predetermined time period; and transmitting, by the computer system over the Internet, the retrieved data associated with the one or more monitored activities to the computing device of the third-party client.

15. The method of claim 1, wherein the receiving of the identification of monitored member and transmission of the electronic message is performed via an application programming interface.

16. The method of claim 1, further comprising:

transmitting, by the computer system over the Internet, an electronic message to a computing device of the member of the Internet-based social network requesting authorization to monitor the member's activities; and receiving, by the computer system from the member's computing device, authorization to monitor the member's activities.

17. A system comprising: one or more hardware processors; and a memory coupled to the one or more hardware processors and storing instructions that, when executed by the one or more hardware processors, cause the system to perform operations comprising:

receiving, over the Internet by a computer system associated with an Internet-based social network, from a computing device of a third-party client external to the computer system, an identification of a member of the Internet-based social network to monitor for compliance with a rule associated with a compliance standard provided by the third-party client, the monitoring being of one or more members of the Internet-based social network;

identifying an activity that is associated with the rule, the activity being requested to be performed by the monitored member on the Internet-based social network, the identifying of the activity being based on matching the activity requested to be performed and an activity specified in a configuration file, the configuration file providing the rule and one or more types of activities to be monitored, the configuration file being provided by the third-party client;

automatically determining, based on the rule and the activity, that the activity is potentially non-compliant with the rule, based on the determination of potential non-compliance of the activity preventing application of the activity to the Internet-based social network, and transmitting an alert to the computing device of the third-party client, the alert identifying the potentially non-compliant activity by the monitored member wherein the rule references the compliance standard, and wherein the identifying of the activity associated with the rule includes: retrieving the compliance standard by the computer system over the Internet; and comparing the activity to the retrieved standard.

18. A non-transitory computer-readable medium storing instructions that, when executed by one or more hardware processors of a computer system, cause the computer system to perform operations comprising:

receiving, over the Internet by the computer system associated with an Internet-based social network, from a computing device of a third-party client external to the computer system, an identification of a member of the Internet-based social network to monitor for compliance with a rule associated with a compliance standard provided by the third-party client, the monitoring being of one or more members of the Internet-based social network;

identifying an activity that is associated with the rule, the activity being requested to be performed by the monitored member on the Internet-based social network, the identifying of the activity being based on matching the activity requested to be performed and an activity specified in a configuration file, the configuration file providing the rule and one or more types of activities to be monitored, the configuration file being provided by the third-party client:

automatically determining, based on the rule and the activity, that the activity is potentially non-compliant with the rule;

based on the determination of potential non-compliance of the activity preventing application of the activity to the Internet-based social network; and transmitting an alert to the computing device of the third-party client, the alert identifying the potentially non-compliant activity by the monitored member wherein the rule references the compliance standard, and wherein the identifying of the activity associated with the rule includes: retrieving the compliance standard by the computer system over the Internet; and comparing the activity to the retrieved standard.

* * * * *

UNITED STATES PATENT AND TRADEMARK OFFICE
CERTIFICATE OF CORRECTION

Page 1 of 2

PATENT NO. : 10,440,134 B1
APPLICATION NO. : 15/371421
DATED : October 8, 2019
INVENTOR(S) : Trachtenberg et al.

It is certified that error appears in the above-identified patent and that said Letters Patent is hereby corrected as shown below:

In the Claims

Column 19, Line 5, Claim 1, delete "rule," and insert --rule by retrieving the compliance standard over the Internet,-- therefor Column 19, Lines 13-14, Claim 1, delete "system based on the rule and the activity," and insert --system,-- therefor Column 19, Line 15, Claim 1, delete "rule;" and insert --rule by comparing the activity to the rule associated with the retrieved compliance standard;-- therefor Column 19, Line 18, Claim 1, delete "network," and insert --network;-- therefor Column 19, Line 25, Claim 1, after "and", insert --¶--

Column 20, Line 49, Claim 17, after "comprising:", insert --¶--

Column 20, Line 64, Claim 17, delete "rule," and insert --rule by retrieving the compliance standard over the Internet,-- therefor Column 21, Lines 6-7, Claim 17, delete "determining, based on the rule and the activity," and insert --determining-- therefor Column 21, Line 8, Claim 17, delete "rule," and insert --rule by comparing the activity to the rule associated with the retrieved compliance standard;-- therefor Column 21, Line 11, Claim 17, delete "network," and insert --network;-- therefor Column 21, Line 18, Claim 17, after "and", insert --¶--

Signed and Sealed this
Twenty-eighth Day of April, 2020

Andrei Iancu
*Director of the United States Patent and Trademark Office*

CERTIFICATE OF CORRECTION (continued)
U.S. Pat. No. 10,440,134 B1

Column 22, Line 5, Claim 18, delete "rule," and insert --rule by retrieving the compliance standard over the Internet,-- therefor Column 22, Line 13, Claim 18, delete "client:" and insert --client;-- therefor Column 22, Lines 14-15, Claim 18, delete "determining, based on the rule and the activity," and insert --determining-- therefor Column 22, Line 16, Claim 18, delete "rule;" and insert --rule by comparing the activity to the rule associated with the retrieved compliance standard;-- therefor Column 22, Line 26, Claim 18, after "and", insert --¶--